United States Patent
Micaelian et al.

(10) Patent No.: US 7,836,057 B1
(45) Date of Patent: Nov. 16, 2010

(54) WEIGHTED PREFERENCE INFERENCE SYSTEM AND METHOD

(75) Inventors: Fadi Victor Micaelian, Belmont, CA (US); Richard Sawey, San Carlos, CA (US); Emil Mario Scoffone, Menlo Park, CA (US); David Brandon Criswell, San Carlos, CA (US); Jie Yang, Palo Alto, CA (US)

(73) Assignee: Auguri Corporation, San Carlos, CA (US)

( * ) Notice: Subject to any disclaimer, the term of this patent is extended or adjusted under 35 U.S.C. 154(b) by 338 days.

(21) Appl. No.: 11/752,605

(22) Filed: May 23, 2007

Related U.S. Application Data

(62) Division of application No. 09/962,708, filed on Sep. 24, 2001, now abandoned.

(51) Int. Cl.
  *G06F 7/00* (2006.01)
  *G06F 17/30* (2006.01)
(52) U.S. Cl. .................................. 707/748; 707/750
(58) Field of Classification Search .............. 707/3, 707/4, 104.1, 2
  See application file for complete search history.

(56) References Cited

U.S. PATENT DOCUMENTS

| | | | |
|---|---|---|---|
| 4,839,822 A | 6/1989 | Dormond et al. |
| 5,297,239 A | 3/1994 | Kurosawa et al. |
| 5,552,995 A | 9/1996 | Sebastian |
| 5,584,024 A | 12/1996 | Shwartz |
| 5,684,704 A | 11/1997 | Okazaki |
| 5,724,567 A | 3/1998 | Rose et al. |
| 5,734,890 A | 3/1998 | Case et al. |
| 5,826,260 A | 10/1998 | Byrd et al. |
| 5,899,991 A | 5/1999 | Karch |
| 5,933,818 A | 8/1999 | Kasravi et al. |
| 5,960,422 A | 9/1999 | Prasad |
| 5,963,939 A | 10/1999 | McCann et al. |
| 5,963,951 A | 10/1999 | Collins |
| 5,966,126 A | 10/1999 | Szabo |

(Continued)

OTHER PUBLICATIONS

Exhibits A and B are exemplary screen shots of an example Decision Support System ("DSS") that was sold in 1995 to the software distributor MacZone in the United States.

(Continued)

*Primary Examiner*—Charles Rones
*Assistant Examiner*—Fariborz Khoshnoodi
(74) *Attorney, Agent, or Firm*—Perkins Coie LLP

(57) ABSTRACT

A search engine for databases, data streams, and other data sources allows user preferences as to the relative importance of search criteria to be used to rank the output of the search engine. A weighted preference generator generates weighted preference information including at least a plurality of weights corresponding to a plurality of search criteria. A weighted preference data search engine uses the weighted preference information to search a data source and to provide an ordered result list based upon the weighted preference information. A method for weighted preference data searching further includes allowing a user to re-rank the ordered result list and determine newly updated weighted preferences based on the re-ranking process. A plurality of weights signifying the relative importance of the search criteria may also be generated by the user inputting an ordered list. This ordered list may be a single alternative or a plurality of alternatives.

13 Claims, 18 Drawing Sheets

U.S. PATENT DOCUMENTS

| | | | |
|---|---|---|---|
| 5,970,482 | A | 10/1999 | Pham et al. |
| 5,983,237 | A | 11/1999 | Jain et al. |
| 6,052,122 | A | 4/2000 | Sutcliffe et al. |
| 6,178,406 | B1 | 1/2001 | Cheetham et al. |
| 6,266,668 | B1 | 7/2001 | Vanderveldt et al. |
| 6,269,303 | B1 | 7/2001 | Watanabe et al. |
| 6,272,467 | B1 | 8/2001 | Durand et al. |
| 6,327,574 | B1 | 12/2001 | Kramer et al. |
| 6,353,822 | B1 | 3/2002 | Lieberman |
| 6,370,526 | B1 | 4/2002 | Agrawal et al. |
| 6,438,579 | B1 | 8/2002 | Hosken |
| 6,442,537 | B1 | 8/2002 | Karch |
| 6,457,052 | B1 | 9/2002 | Markowitz et al. |
| 6,463,428 | B1 | 10/2002 | Lee et al. |
| 6,473,751 | B1 | 10/2002 | Nikolovska et al. |
| 6,499,029 | B1 | 12/2002 | Kurapati et al. |
| 6,510,417 | B1 | 1/2003 | Woods et al. |
| 6,526,411 | B1 | 2/2003 | Ward |
| 6,546,388 | B1 | 4/2003 | Edlund et al. |
| 6,549,897 | B1 | 4/2003 | Katariya et al. |
| 6,556,985 | B1 | 4/2003 | Karch |
| 6,578,022 | B1 | 6/2003 | Foulger et al. |
| 6,584,471 | B1 | 6/2003 | Maclin et al. |
| 6,609,108 | B1 | 8/2003 | Pulliam et al. |
| 6,701,311 | B2 | 3/2004 | Biebesheimer et al. |
| 6,714,929 | B1 * | 3/2004 | Micaelian et al. ............. 707/4 |
| 6,732,088 | B1 | 5/2004 | Glance |
| 6,748,484 | B1 | 6/2004 | Henderson et al. |
| 2001/0029183 | A1 | 10/2001 | Ito |
| 2001/0054054 | A1 | 12/2001 | Olson |
| 2002/0004757 | A1 | 1/2002 | Torres et al. |
| 2002/0024532 | A1 | 2/2002 | Fables et al. |
| 2002/0032638 | A1 | 3/2002 | Arora et al. |
| 2002/0042786 | A1 | 4/2002 | Scarborough et al. |
| 2002/0055900 | A1 | 5/2002 | Kansal |
| 2002/0059228 | A1 | 5/2002 | McCall et al. |
| 2002/0103792 | A1 | 8/2002 | Blank et al. |
| 2002/0129014 | A1 | 9/2002 | Kim et al. |
| 2002/0138399 | A1 | 9/2002 | Hayes et al. |
| 2002/0138481 | A1 | 9/2002 | Aggarwal et al. |
| 2002/0173978 | A1 | 11/2002 | Boies et al. |
| 2002/0191954 | A1 | 12/2002 | Beach et al. |
| 2003/0014326 | A1 | 1/2003 | Ben-Meir et al. |
| 2003/0014428 | A1 | 1/2003 | Mascarenhas |
| 2003/0061201 | A1 | 3/2003 | Grefenstette et al. |
| 2003/0061202 | A1 | 3/2003 | Coleman |
| 2003/0061214 | A1 | 3/2003 | Alpha |
| 2003/0061242 | A1 | 3/2003 | Warmer et al. |
| 2003/0101286 | A1 | 5/2003 | Kolluri et al. |
| 2003/0217052 | A1 | 11/2003 | Rubenczyk et al. |

OTHER PUBLICATIONS

Kiebling, Werner, "Foundations of Preferences in Database Systems", 2002 VLDB conference http://222.cs.ust.hk/vldb2002/program-info/research.html (PDF Presentation Slides—2.9 MB) University of Augsburg, Germany.

Kossmann, Donald et al., "Shooting Stars in the Sky: An Online Algorithm for Skyline Queries", 2002 VLDB conference http://222.cs.ust.hk/vldb2002/program-info/research.html (PDF Presentation Slides—83 MB) Technische Universitat Munchen, Germany.

User Manula for the Product "Auguri Triple C," that was sold in 1995 to the Software Distributor Maczone in the United States.

* cited by examiner

FIG. 4
PROPERTY TABLE: CARS
← PROPERTIES →

| MAKE | COLOR | PRICE | HP | GAS MILEAGE | CUP HOLDER |
|---|---|---|---|---|---|
| FERRARI | RED | $100,000 | 500 | 30 | NO |
| MUSTANG | BLACK | $25,000 | 300 | 35 | YES |
| YUGO | GREEN | $8,000 | 50 | 18 | YES |

ALTERNATIVES { FERRARI, MUSTANG, YUGO }

FIG. 5
WEIGHTS TABLE

| MAKE | COLOR | PRICE | HP | GAS MILEAGE | CUP HOLDER |
|---|---|---|---|---|---|
| 0 | 10 | 5 | 0 | 1 | 0 |

FIG. 6A

| COLOR | VALUE |
|---|---|
| RED | 6 |
| BLACK | 1 |
| GREEN | 3 |

FIG. 6B
SUBJECTIVE ORDERING TABLE

| MAKE | COLOR | PRICE | HP | GAS MILEAGE | CUP HOLDER |
|---|---|---|---|---|---|
| FERRARI | 6 | $100,000 | 500 | 30 | 0 |
| MUSTANG | 1 | $25,000 | 300 | 35 | 1 |
| YUGO | 3 | $8,000 | 50 | 18 | 1 |

Auguri2000 Decision Engine

Use this screen to tell us what you care about in your new car and we'll then tell you what cars we think you should consider.

On the left indicate how much you care about a feature by adjusting the slide controls. For example if you care a lot about safety and price then set the slide each to the extreme right. Remember you're saying you care a lot about price, not that you're willing to pay a lot of money! When you're ready hit the and our SmartSearch engine will return a list of appropriate vehicles for your consideration.

Specify Preferences

- Speed
- Performance
- Safety
- Gas Mileage
- Maintenance Costs
- Comfort
- Price

SEND

Vehicle Ranking

| Rank | Vehicle | Score | Talk To Us Now |
|---|---|---|---|
| 1 | Ford Focus | 96% | Online |
| 2 | Ford Explorer | 88% | Online |
| 3 | Ford Taurus | 54% | Online |
| 4 | Ford Mustang | 60% | Online |
| 5 | Ford Escort | 48% | Online |

INITIAL
PREFERENCES

Auguri2000 Comparison Tool

Richard Ford

Tell Us About Vehicles You Know

Choose up to three vehicles you've driven or know well. Then use the slide bar to let us know how well you liked each of them.

Vehicle One
- 1995
- BMW
- 3 Series
- 325i 4 Dr Sedan

Poor — Excellent

Vehicle Two
- Select Model Year
- Select Manufacturer
- Select Model
- Select Trim Level Poor — Excellent

Vehicle Three
- Select Model Year
- Select Manufacturer
- Select Model
- Select Trim Level Poor — Excellent Make Recommendations Clear Entries Go Back To Start Page

Auguri2000 Comparison Tool

Richard Ford

Use this screen to tell us what you care about in your new car and we'll then tell you what cars we think you should consider.

On the left indicate how much you care about a feature by adjusting the slide controls. For example if you care a lot about safety and price then set the slide bar for each to the extreme right. Remember you're saying you care a lot about price, not that you're willing to pay a lot of money! When you're ready hit the Rank arrow and our SmartSearch engine will return a list of appropriate vehicles for your consideration.

| Importance | | |
|---|---|---|
| Low | | High |
| Gas Mileage | | |
| Space | | |
| Price | | |
| Quality | | |
| Performance | | |

RANK →

| Rank | Vehicle | Score | Talk |
|---|---|---|---|
| 1 | 2001 Ford Mustang GT 2 Dr Coupe | 70% | Talk Now |
| 2 | 2001 Ford Escort ZX2 Escort ZX2 2 Dr Coupe | 61% | Talk Now |
| 3 | 2001 Ford F150 Regular Cab SVT Lighting Flareside 2 Dr Reg. Cab | 60% | Talk Now |
| 4 | 2001 Ford Focus ZX3 Hatchback 2 Dr Hatchback | 58% | Talk Now |
| 5 | 2001 Ford Tarus SEL 4 Dr Sedan | 53% | Talk Now |

|   |   |         | PRICE | PERFORMANCE | COMFORT |       |
|---|---|---------|-------|-------------|---------|-------|
| 2 | 1 | FERRARI | 0.1   | 0.9         | 0.7     |       |
| 1 | 2 | MUSTANG | 0.4   | 0.7         | 0.6     |       |
| 3 | 3 | YUGO    | 0.9   | 0.2         | 0.2     |       |

| | PRICE | PERFORMANCE | COMFORT | |
|---|---|---|---|---|
| FERRARI - MUSTANG | -0.3 | 0.2 | 0.1 | |
| $W_{INITIAL}$ | 0.5 | 0.3 | 0.2 | Sum=1 |
| $W_{NEW}$ | 0.75 | 0.05 | 0.2 | Sum=1 |

FIG. 17

$$\begin{pmatrix} a_{11} & a_{12} & \cdots & a_{1n} \\ a_{21} & a_{22} & \cdots & a_{2n} \\ \vdots & \vdots & \ddots & \vdots \\ a_{x1} & a_{x2} & \cdots & a_{xn} \\ 1 & 0 & \cdots & 0 \\ 0 & 1 & \cdots & 0 \\ \vdots & \vdots & \ddots & \vdots \\ 0 & 0 & \cdots & 1 \end{pmatrix} \begin{pmatrix} w_1 \\ w_2 \\ \vdots \\ w_n \end{pmatrix} = \begin{pmatrix} s_1 \\ s_2 \\ \vdots \\ s_x \\ w^*_1 \\ w^*_2 \\ \vdots \\ w^*_n \end{pmatrix}$$

FIG. 19

$$\begin{pmatrix} a_{11} & a_{12} & \cdots & a_{1n} \\ a_{21} & a_{22} & \cdots & a_{2n} \\ \vdots & \vdots & \ddots & \vdots \\ a_{x1} & a_{x2} & \cdots & a_{xn} \\ 1 & 0 & \cdots & 0 \\ 1 & 0 & \cdots & 0 \\ 0 & 1 & \cdots & 0 \\ 0 & 1 & \cdots & 0 \\ \vdots & \vdots & \ddots & \vdots \\ 0 & 0 & \cdots & 1 \\ 0 & 0 & \cdots & 1 \end{pmatrix} \begin{pmatrix} w_1 \\ w_2 \\ \vdots \\ w_n \end{pmatrix} = \begin{pmatrix} s_1 \\ s_2 \\ \vdots \\ s_x \\ \alpha \\ \beta \\ \alpha \\ \beta \\ \vdots \\ \alpha \\ \beta \end{pmatrix}$$

FIG. 20

WEIGHTED PREFERENCE INFERENCE SYSTEM AND METHOD

CROSS REFERENCE TO RELATED APPLICATIONS

This application is a divisional of co-pending patent application Ser. No. 09/962,708, filed Sep. 24, 2001, which application is related to U.S. Pat. No. 6,714,929, issued Mar. 30, 2004, both of which applications are incorporated herein by reference.

BACKGROUND OF THE INVENTION

This invention relates generally to methods and systems for developing search parameters to retrieve information from, for example, relational databases and other information sources.

An increasingly vast amount of data is being stored in digital electronic formats. The value of this data is often dependent upon how effectively it can be retrieved to provide useful information. For this reason, a variety of database structures and database search engines have been developed over the years.

A large body of data has been stored in proprietary databases, which are accessed via custom-crafted software ("code"). In such proprietary databases, there is a tight coupling between data organization (i.e. in the actual data structure) and in the access and query code. While the advantages of such proprietary databases include speed of access, compactness, and simplicity, they are typically not well suited for general-purpose data storage and retrieval applications. This is because with proprietary databases modifications to the data structures requires the rewriting of the access and query code, and because the queries tend to be fixed by being implemented in a programming language and then being compiled into the query code.

With the ever increasing amount of electronic data available and with the increasingly sophisticated demands for specialized information derived from such data, search engine techniques have become increasingly sophisticated and generalized. At the present time, the two main approaches for information retrieval include relational database searching engines, and text-based searching technologies as used, for example, for Internet searching.

Relational databases have been increasingly utilized over the past two decades in order to overcome the limitations of previous database architectures. One of the great strengths of relational databases is that they offer a flexible way to access the data along different dimensions and based on a set of criteria. The industry standard language, Structured Query Language (SQL), is used to define and execute such queries. SQL was initially designed by IBM Corporation and was later popularized by including in relational database engines from such companies as IBM and Oracle Corporation, amongst others.

By using a relational database search engine such as SQL or the like, information can be obtained from the relational database based upon a multiplicity of factors. For example, a SQL inquiry can search a personnel database of a company for all employees that are making more than $20,000 a year and who have been employed with the company for less than twenty years.

Relational database search engines, such as the aforementioned SQL search language, suffer from the disadvantage of creating "yes or no" or "black and white" results. Using the previous example, if a user is searching for company employees making a salary of greater than $20,000 and less than twenty years with the company, would miss all of the employees that were making exactly $20,000 or a few dollars less than $20,000 and those that worked exactly twenty years at the company or just over twenty years for the company, e.g. twenty years and one day. As such, there is no "fuzziness" in such a relational database search request, and no indication of the importance of exactly fitting within the search criteria.

Additionally, relational database search engines, such as the aforementioned SQL search language, suffer from the disadvantage of being unable to derive the original query parameters based on the results of a query. In other words, it is typically impossible to infer the original query's selection clauses based solely on the collection of records returned by a query.

Sophisticated search engines using text-searching technologies approach the problem from a different direction. These text-searching technologies are used by Internet-based search engines such as Yahoo!, Alta Vista, etc. With the text based searching technologies, the search engine creates indexes based upon the words found in searched documents. When a user specifies one or more phrases to the search engine, the search engine checks these indexes and then uses some algorithm to produce a ranking of all the documents that contain the search words or phrases. The algorithm varies depending upon the search engine, but may be as simple as a word count.

Text based search engines suffer from several limitations. For one, they cannot perform trade-off analysis between various criteria, such as searching for information concerning cars which cost less than $30,000 and which have engines with more than 500 horsepower. For another, they are limited to text-based documents as their search domain. Finally, they do not provide any effective means for a user to specify how important a particular word is to that use.

The prior art therefore suffers from the inability for user or automated clients of a database search engine to specify preferences or "weights" with respect to various search criteria, thereby introducing a degree of "fuzziness" into the search request which provides a better retrieval of information from the database or other data source.

Another drawback of the prior art is that it does not aid the user in refining his searches or search techniques if search results are deemed poor. If a user conducts a search and the results are not appropriate, the system provides poor, if any, hint or feedback of more appropriate search criteria to the user. That is, only slight modifications of search techniques or terms may be necessary to arrive with the desired results, but prior art systems are not helpful in suggesting how to refine or adjust the search parameters to make those slight modifications.

Another drawback of the prior art is that conventional search engines do not "infer" what the search criteria was from chosen results. Still further, in the prior art if a user is aware of pertinent items in a relational database, there is no way to ascertain what characteristics (or search criteria) of the items distinguish them from other items in the database.

SUMMARY OF THE INVENTION

The present invention allows users and automated clients of a database search engine to infer the importance of various search criteria when making data searches. This permits a ranking of search results to present data in a more relevant fashion to the user or other client (e.g. an automated process).

The present invention also allows for a determination of the search criteria ("query") weights based on, for example, a ranked result list.

A weighted preference information search system includes a weighted preference generator and a weighted preference data search engine. The weighted preference generator develops weighted preference information including weights corresponding to search criteria.

The weighted preference data search engine uses the weight of the preference data to search an information source and to provide an ordered result list based upon the weighted preference information.

A weight inference engine is provided which allows a calculation of weights after the user has rearranged the order of the ranked list. Preferably, the inference engine uses heuristics and/or algorithms that reflect the nature of the user feedback with the system. The weight inference engine further preferably provides feedback to the user to clarify what criteria appear to be important in the decision making process or search.

The inference engine can calculate weights based upon multiple schema. For example, the inference engine can calculate weights after a user has reordered a ranked list that was generated from an initial set of weights. This would provide the user the ability to interactively re-rank the result list until a desired weighting scheme has been developed. Alternatively, the inference engine can determine the weights of each specific search criteria when one alternative is selected as the user's top choice among the alternatives. Still further, the inference engine can generate weights from a ranked list wherein each alternative on the list has been given a score by the user which indicates the overall desirability of each of the alternatives. The last two methodologies do not require starting with an initial set of weights; i.e. the weights are inferred based on the score given each alternative.

In a preferred embodiment of the present invention, the weighted preference generator is preferably a "client" to the weighted preference data search engine. Alternatively, the weighted preference generator and weighted preference data search engine can be integrated processes. As a client, the weighted preference generator can include a user interface which allows a human user to input preferences into the generator. These preferences can include one or more of the selection of search criteria, the adjustment of weights with respect to the search criteria, and an indication of subjective ordering of at least one of the search criteria. Alternatively or additionally, the weighted preference generator can provide weighted preference information based upon at least one of default values, automated heuristics, user input, or other sources of input such as other computer based systems as well as from devices such as machine sensors, temperature gauges, etc.

Preferably, the weighted preference data search system includes a data store and an algorithm processor. The data store stores data for the use of the algorithm processor such as client preferences, historical search data, and intermediate search results. The algorithm processor includes a data source reader, a normalizing alternative distance calculator, an alternative scorer which creates a ranking for the alternatives based upon the normalized alternative distances and weighted preference information, and a weight calculator to obtain new weights from ranked lists of alternatives.

A method for weighted preference data searching in accordance with the present invention includes inferring weighted preference information including a plurality of search criteria and a corresponding plurality of weights signifying the relative importance of the search criteria, and querying an information source and ranking the results based upon the weighted preference information. The data sources are often a database, e.g. a relational database. Alternatively, the data source can be a data stream which is arriving either in real-time or which has been buffered in a computer readable media.

An advantage of the present invention is that complex database queries can be automatically generated or "inferred" that have a degree of "fuzziness" which are based upon user or other client input as to the importance or "weight" of particular search criteria. By providing this functionality, the search engine can provide results that are ranked by factoring a number of weighted search criteria to obtain results that best match the client's specifications.

Another advantage of the present invention is its ability to enhance searches through an imbedded trade-off analysis capability, such that the user does not need to perform trade-off analysis by a time consuming "trial and error" approach through a repetitive set of queries.

Yet another advantage of the present invention is its ability to infer the relative importance of search parameters from the result set from a query, thereby "back-calculating" the tradeoff process mentioned above.

These and other advantages of the present invention will become apparent to those skilled in the art upon a reading of the following detailed descriptions and a study of the various figures of the drawings.

BRIEF DESCRIPTION OF THE DRAWINGS

FIG. 4 is a property table used to illustrate the "IDENTIFY DATA TO SEARCH" operations of FIG. 3;

FIG. 5 is a criteria table used to illustrate the "SELECT CRITERIA" and "ADJUST WEIGHTS" operations of FIG. 3;

FIG. 6 is a subjective ordering table illustrating the "MAKE SUBJECTIVE ORDERING" operations of FIG. 3;

FIG. 7 is a "screen shot" of a web page allowing for adjustment of weights;

FIG. 8 is a screen shot of a web page allowing for the adjustment of ranked lists.

FIG. 11 is a screen shot of a user-provided desirability list.

FIG. 12 is a screen shot of the resulting weights calculated from a user provided desirability list.

FIG. 17 illustrates the processes of FIGS. 15 and 16

FIG. 19 illustrates a matrix calculation process used in the process of FIG. 18.

FIG. 20 illustrates an alternative matrix calculation process used in the process of FIG. 18.

DETAILED DESCRIPTION OF THE PREFERRED EMBODIMENTS

Figure 1:
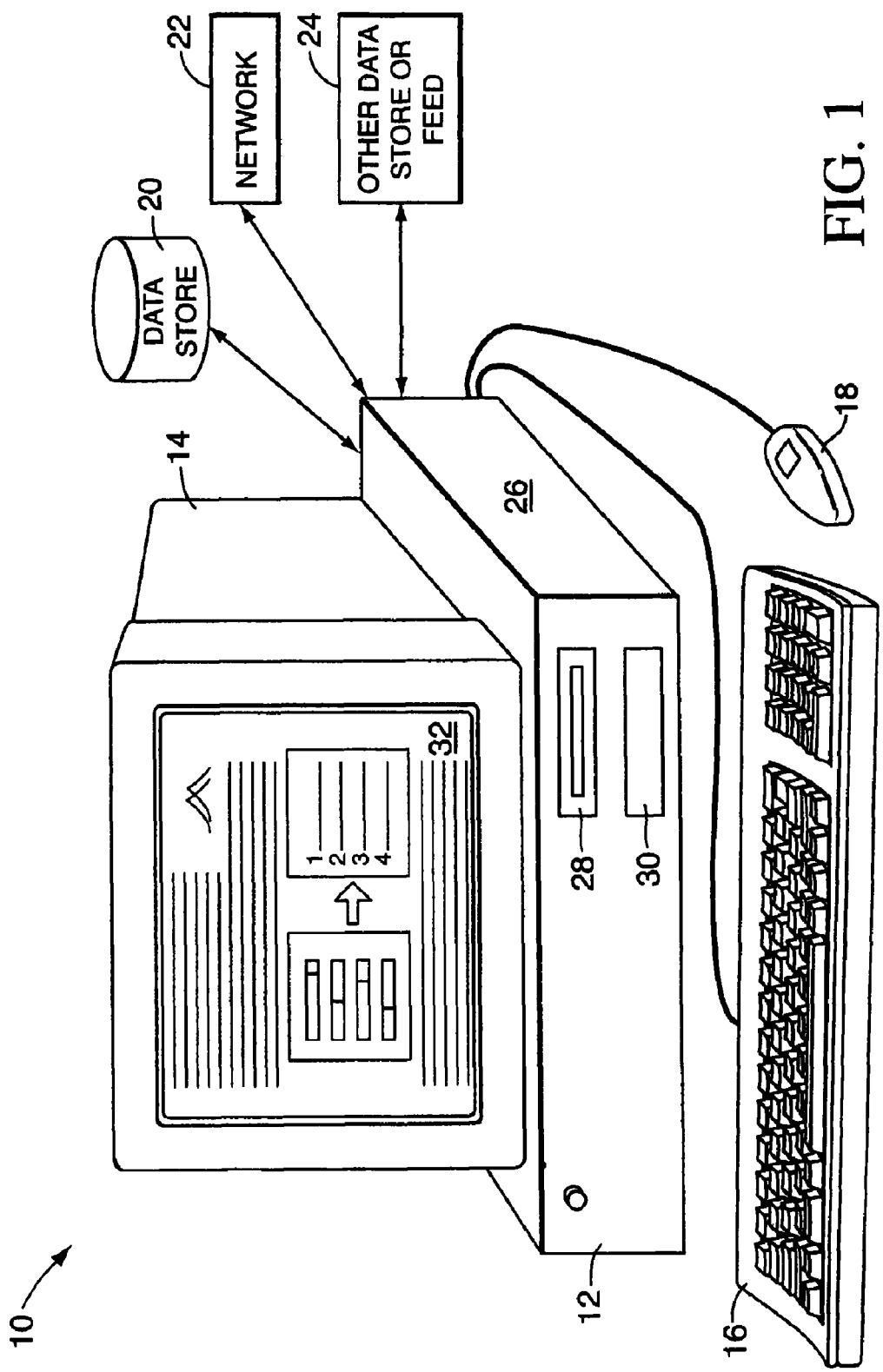
FIG. 1 is an exemplary computer system implementing the weighted preference data search system and method of the present invention.

FIG. 1 illustrates a computer system 10 which can be used to implement a weighted preference data source search system and a method for weighted preference data source searching in accordance with the present invention. The computer system 10 includes a computer unit 12, a computer monitor 14, a keyboard 16, and a pointing device such as a mouse 18. The computer system 10 also typically includes a number of peripheral devices and connections including external data stores 20 (such as hard disk and optical drives), network connections 22, and other data stores or data feeds 24.

The computer system 10 serves as an illustration of one of a variety of data processing units including personal computers, workstations, network computers, etc. If implemented as a personal computer, it typically includes an enclosure 26 enclosing a motherboard having a microprocessor CPU, computer readable media such as the RAM, ROM, hard disk drives, etc., and a number of peripherals. Peripherals can include, for example, floppy disk drive 28, DVD/CD-ROM drives 30 etc., which accept removable computer readable media which typically stores data in magnetic, optical or magneto-optical fashions. The computer monitor 14 includes a screen 32 which can provide user feedback and thus, along with keyboard 16 and mouse 18 form part of the user/computer interface. The components of computer system 10 are commercially available and are well known to those skilled in the art.

Figure 2:
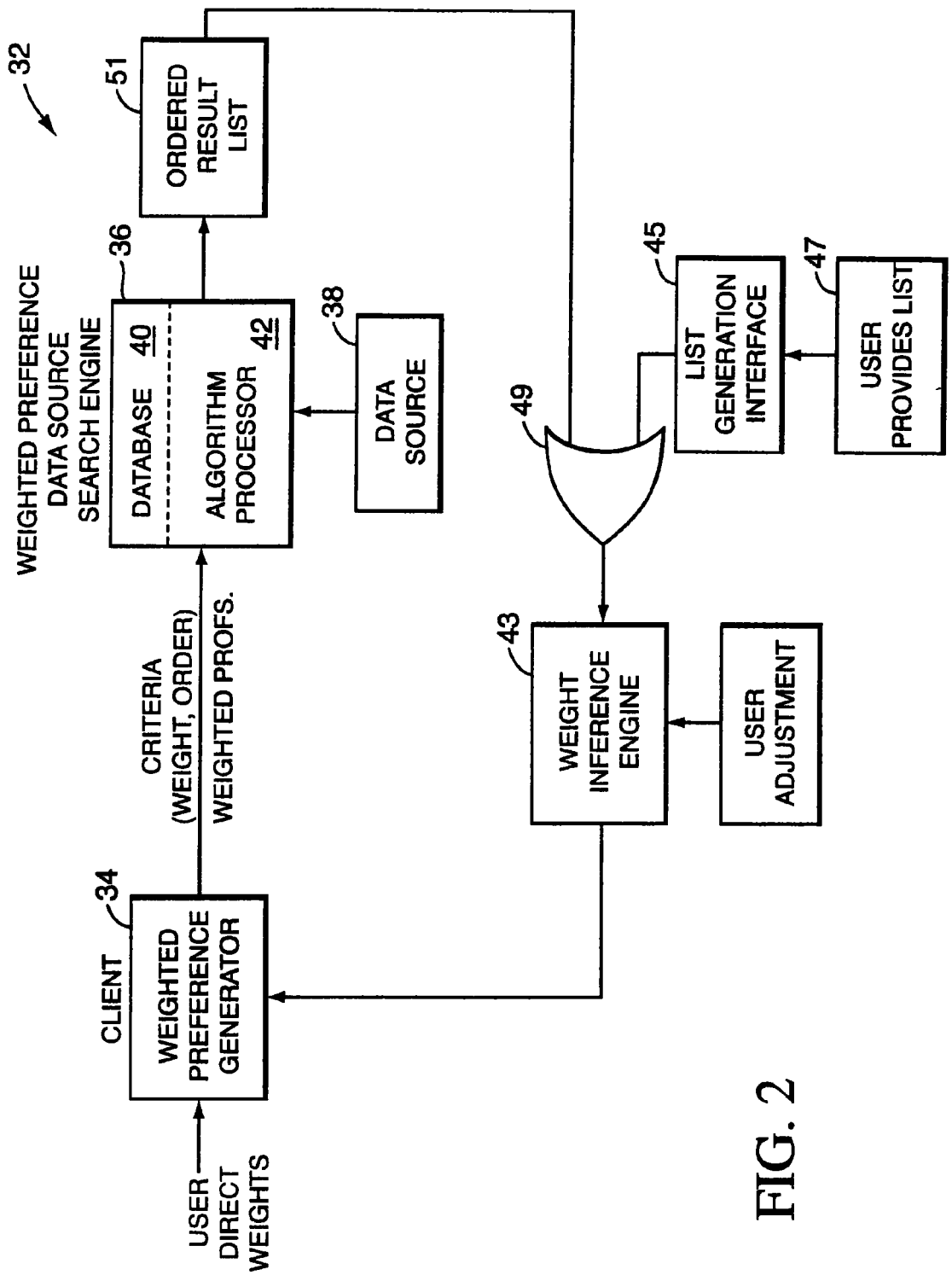
FIG. 2 illustrates a weighted preference data search system and weight inference engine in accordance with the present invention.

FIG. 2 illustrates a weighted preference data source search system 32 which can be implemented on the computer system 10. Again, the computer system 10 is just one way to implement the search system 32 since the systems and methodologies of the present invention can be distributed or combined in a variety of fashions over a local or extended network, as will be appreciated by those skilled in the art. The weighted preference data source search system 32 preferably includes a weighted preference generator 34, a weighted preference data source search engine 36, and a weight inference engine 43. The search engine 36 interfaces with a data store or feed 38, as will be appreciated by those skilled in the art.

The data source 38 is typically a database. Most large and/or sophisticated databases are now relational databases due to the advantages described previously. Alternatively, the data source can be an information stream or feed coming in, for example, from a wire or cable service, or from machine sensors. For example, stock market data can be retrieved as a continuous information stream. This information stream can be processed in real time, or can be buffered in a computer readable media for time-delayed data processing.

The weighted preference generator 34 is, in the embodiment of FIG. 2, a client to the search engine 36. The weighted preference generator 34 provides weighted preferences to the search engine, which preferably include criteria and associated weights and subjective ordering. Alternatively, the weighted preference generator can be integrated with the functionality of the search engine.

It should be noted that the weighted preference generator 34 can be an automated client, a human user client, or a combination of the two. If fully or partially automated, the client can provide weighted preference information to the search engine 36 based upon certain stored default values or based upon automated heuristics. The automated heuristics can be produced by a number of techniques well known to those skilled in the art including historical or demographic data analysis, artificial intelligence techniques, fuzzy logic techniques, rule of thumb, input device, etc.

In the illustrative embodiment of FIG. 2, the weighted preference data source search engine 36 includes a database 40 and an algorithm processor 42. The database 40 is used by the algorithm processor and can include such data as client preferences, historical search data, and intermediate search results. It is not typically the subject of the search desired by the client 34. As will be described in greater detail subsequently, the algorithm processor 42 preferably includes a data source reader, a normalizing alternative distance calculator, and an alternative scorer which creates a ranking for the alternatives.

An example of one embodiment of the present invention as shown in FIG. 2 is as follows. A user first inputs desired weights (typically a number from 0 to 100) representing the relative importance of each specific search criteria in element 34. The weighted preference data source search engine 36 will then output an ordered result list 51 based on the input weights. Using a user input 47, the user may reorder the result list by simply, for example, "moving" (such as a click and drag operation) one element in the list to another location in the list. For example, moving the third element on the list can be moved up to the first position on the list. Once the user reorders the list, the weight inference engine calculates the weights based on this reordering. The calculated new weights are then displayed to the user so the user is aware of the effect of his choices on the relative importance of the selection criteria. The process may go on indefinitely as long as the user keeps reordering the list. After each new ordering new weights will be calculated, and a newly ranked list displayed.

The logical OR function 49 allows for a different type of user input into the weight inference engine. Instead of beginning the search process by inputting relative weights of specific criteria, a list generation interface 45 allows for a list of preferences to be entered by a user. The list may be one item or a number of ranked items. For example, a user may directly rank his top five car choices. Once this ordered list is entered, the weight inference engine 43 will display the calculated weights that appear to be the basis of the user's rankings. For example, when looking for cars, ranking a Ford Mustang as the user's number one choice may result in the weight inference engine 43 inferring that performance is more important than price for the user. If a Ford Escort is input as the user's top choice, the weight inference engine would calculate and display that cost is heavily weighted while performance is not. FIG. 11 shows this type of inputted list. The algorithm for weight inference is shown in FIGS. 18-23.

Figure 3:
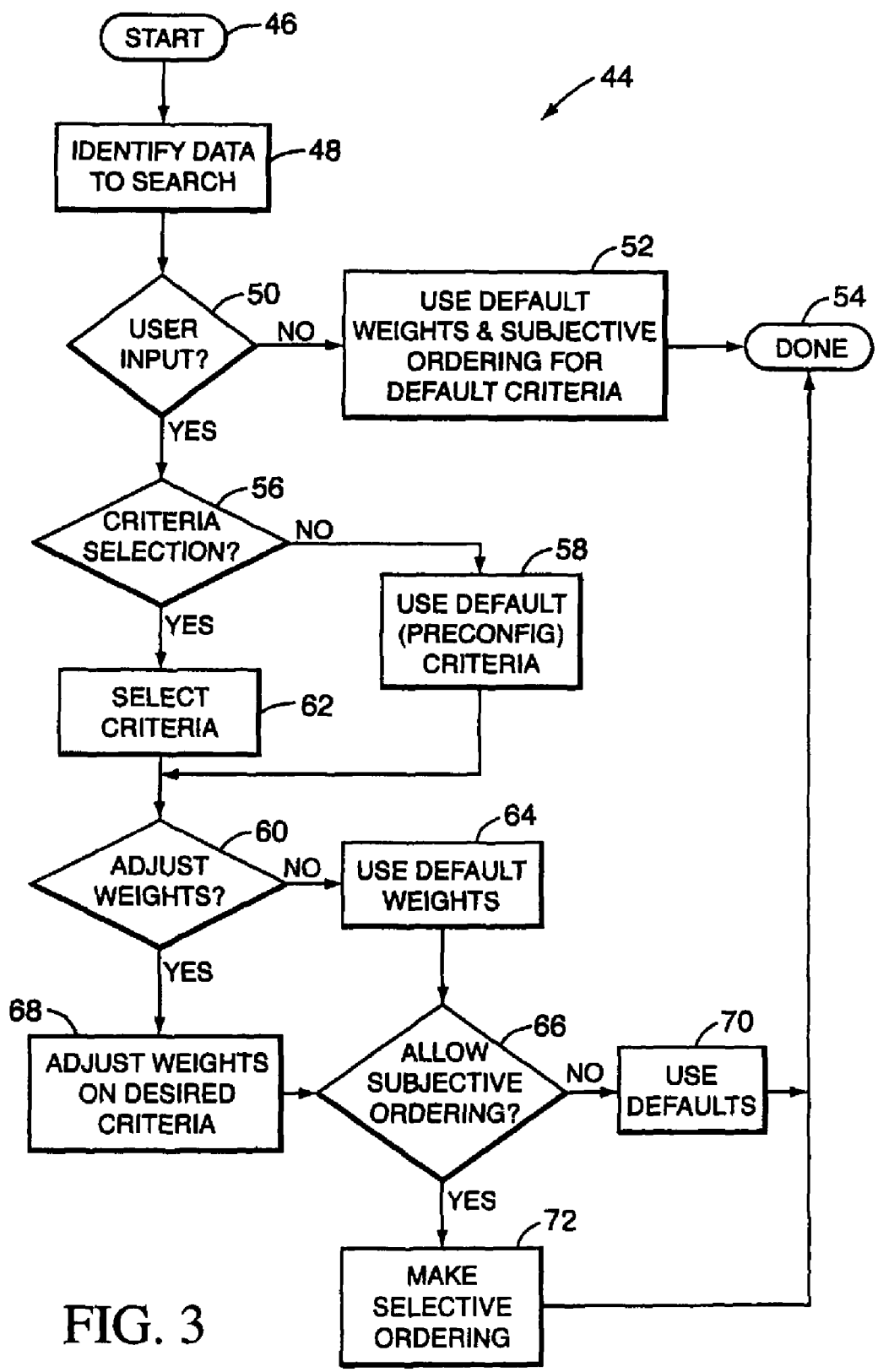
FIG. 3 is a flow diagram illustrating processes implemented by the weighted preference generator of FIG. 2.

FIG. 3 is a flow diagram of a method 44 which can be implemented by the weighted preference generator 34 of the FIG. 2. The method 44 begins at 46 and, in an operation 48, the information to be searched is identified. The method or process 44 then determines in a decision operation 50 whether there is user input by the client 34. If not, an operation 52 uses default weights and subjective ordering for the default criteria. As explained previously, these default weights can either be stored defaults or can be determined by one of a number of automated heuristics or other techniques. The process 44 can then be completed at 54.

If there is user input as determined by decision operation 50, a decision operation 56 determines whether there is to be criteria selection by the user. If not, operation 58 assigns default (e.g. pre-configured) criteria, using the definition of "default" as described above to include either stored values or automatically created values based upon some form or heuristics. The method 44 then determines in an operation 60 whether the user should be allowed to adjust the weights. If operation 56 determines that the user is to be allowed criteria selection then the criteria selected in an operation 62 before process control is turned over to operation 60.

In operation 60, it is determined whether the weights are to be adjusted by the user. If not, default weights are assigned in an operation 64 (using the same definition as above), and operational control is turned over to operation 66 to determine if the user should be allowed subjective ordering. If operation 60 determines that the user is allowed to adjust the weight, an operation 68 inputs the adjusted weights on desired criteria from the user. Operational control is then turned over to operation 66.

In operation 66, it is determined whether the user should do subjective ordering. If not, defaults are assigned (using the same definition as above) in an operation 70 and the process 44 is completed at 54. If operation 66 determines that subjective ordering is to be allowed, selective ordering is input from the user in an operation 72 before the process is completed at 54.

FIG. 4 is an illustration of a property table and helps to illustrate the "IDENTIFY INFORMATION TO SEARCH" operation 48 to FIG. 3. As will be appreciated by those skilled in the art, in a relational database search the table illustrated in FIG. 4 would be accessed through an SQL query. In this instance, the table of FIG. 4 is the property table for cars. The table includes a set of alternatives, in this case car models, where each alternative is on a separate row. The columns of the table provide the properties for each alternative. In this example, the various properties include make, color, price, engine horsepower (HP), gas mileage, and the availability of a cup holder. To keep things simple, three alternatives are shown namely for the makes of Ferrari, Ford Mustang, and Yugo. These might represent, for example, the available cars on a particular car lot and list the designated properties for each of the available makes. As can be seen, the properties associated with the different makes of cars can vary considerably from car to car, making it difficult to select which type of car to present to the user or other client until the user or client provides an indication of the relative importance of the various properties.

FIG. 5 illustrates a criteria table which is used to help to explain the criteria selection and weight adjustment operations of FIG. 3. In this illustrated example, a variety of "weights" indicating the relative importance to the user or other client is illustrated, where these weights range from zero to ten. In this illustrated example, a zero means that the property or "criteria" is of no importance and, effectively, this criteria or property is not selected. A ten indicates that this property or criteria is of utmost importance to the user or other client. In this example, make, engine horsepower, and cup holder were assigned a zero weight meaning, essentially, that these criteria were not selected and therefore have no effect on the ranking. On the other hand color, price, and gas mileage were assigned a weight, meaning that these criteria were selected. It is clear from the illustrated criteria table of FIG. 5 that the user or other client in this instance feels that color is the most important criteria in selecting a car, price less so, and gas mileage, while not totally irrelevant, is not a very important consideration. On the other hand the make of the car, its engine horsepower, and whether or not it has a cup holder is of no importance to the user or other client.

FIG. 6A illustrates a subjective ordering conversion table, which can be used, for example, to populate the "color" column in a subjective ordering table as illustrated in FIG. 6B. Subjective ordering conversion tables are populated by a user's input or are automatically heuristically determined.

FIG. 6B is a subjective ordering table, which will be used to help explain the subjective ordering operations of FIG. 3. While, in theory, virtually any property or criteria is subject to subjective ordering, often criteria have an implicit subjective ordering that does not require user input. For example, if price is important to a user or other client, it can be assumed that they want the lowest price available, not the highest price available. Likewise, if gas mileage is of importance to a user or other client, it can be assumed that they would like the highest possible gas mileage, not the lowest possible gas mileage. However, certain properties or criteria are purely subjective. As noted in the example of FIG. 5, color is indicated to be of great importance. However, different people like different colors. For example, some people like cherry red cars, while other people would not be caught driving a cherry red car. Therefore, as illustrated in the second column of FIG. 6, the colors of the various makes of cars have been subjectively ordered by the user or other clients. In this instance, the color red has been assigned a relatively high numeric value of 6, the color black has been assigned a relatively low number of 1, and the color green has been assigned the intermediate numeric value of 3. As it will be appreciated, since the color of red is of high importance to the user or other client the user or other client may be steered towards the Ferrari. On the other hand, since price is also important (although as not as important as color) the user or other client might be steered towards the Ford Mustang. The balancing of these various weighted alternatives will ultimately result in a ranking of desirability of the various alternatives, as will be explained in greater detail with respect to the following descriptions.

FIG. 7 is a "screen shot" 90 (i.e. a representation of what is seen on the screen of a computer) of a web page that is used to illustrate how a user can adjust the weights of selected criteria and produce a ranked results list of alternatives. In FIG. 7, a weight adjustment interface 92 lists a number of properties including a speed property 94, a performance property 96, a safety property 98, a gas mileage property 100, a maintenance cost property 102, a comfort property 104, and a price property 106. Associated with each of these properties is a "slider bar" 112 including a diamond shaped indicator 108 (in this example) which can be adjusted in position along the length of the slider bar, as will be appreciated by those skilled in the art. In a typical interface, a pointer 108 controlled, for example, by a pointing device 18 of computer system 10 of FIG. 1, is used to engage an indicator 108 and to drag to a desired position between the "not important" and the "very important" ends of the slider bar 112. The making and use of slider bars is well known to those skilled in the art. The position of the indicator 108 along the slider bar 112 is translated into a numeric output, typically a normalized value between zero and one, which is the weight for the criterion.

As will be discussed in greater detail subsequently, the user input is analyzed as indicated by the arrow 114 to provide an ordered or ranked list 116 which reflects the preferences of the user. As can be seen in the illustration of FIG. 7, the Ford Focus ZX3 coupe had the best overall score and was ranked #1 based upon the weighted preferences that were input in the weight adjustment section of screen shot 90. This was followed by the Ford Explorer TWD Sport Utility 4D, which was ranked #2, the Ford Taurus SE V6 Wagon 4D, ranked at #3, etc.

Figure 8:
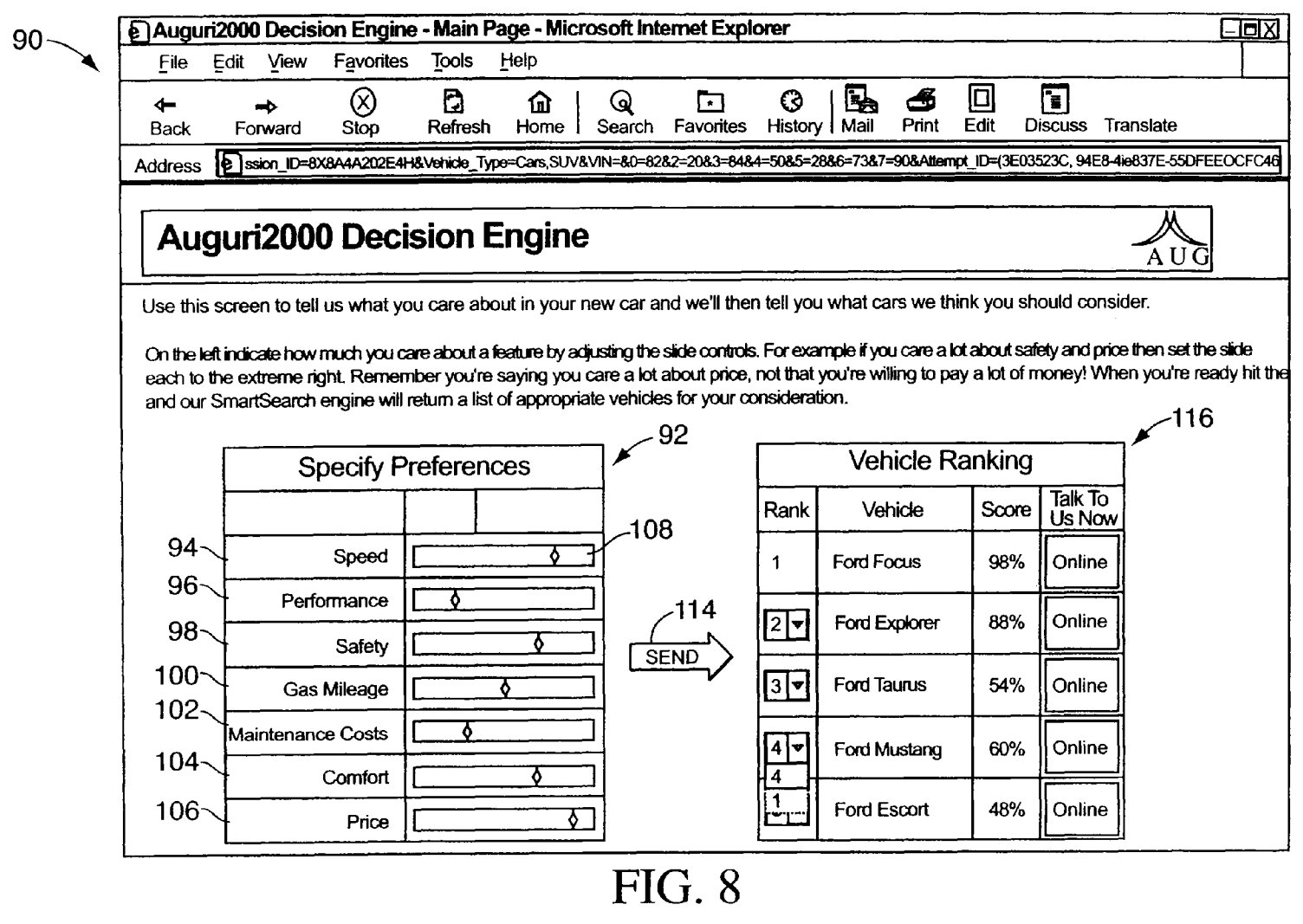
Figure 9:
FIG. 9 is another screen shot of a web page illustrating the readjustment of weights based on the reordered results list.

FIG. 8 illustrates how the user may change the order of the results list, and thereby instigate the process for weight calculation. A first embodiment of the present invention allows the user to reorder the list as many times as deemed necessary. With each reordering the weights are calculated. A drop down box allows the user to change the number that indicates the rank of the alternative on the list. For example, the inputted weights in FIG. 7 gave a result list of the order: 1) Focus 2) Explorer 3) Taurus 4) Mustang and 5) Escort. FIG. 8 shows the Mustang being reordered to #1, and FIG. 9 shows a new reordered list of 1) Mustang 2) Taurus 3) Explorer 4) Focus 5) Escort. This new ordering will result in the weights of the selected criteria being changed. That is, FIG. 9 shows the resulting changes in weights, and associated changes in rankings, produced by the reordering of FIG. 8. The indicators 108 are shown to be moved from their original positions as set by the user. These weight calculations are performed by the weight inference engine 43 as shown in FIG. 2. In this example the Mustang has been moved from the fourth position into the first position. Given the new order, the weight inference engine must calculate the weights to justify this new order.

As is shown in FIG. 9, the indicator 108 for the "Speed" criteria and "Performance" criteria have both moved up. The weights for features such as "Safety", "Gas Mileage", "Maintenance Costs" and "Price", have moved down in order to justify the new list ordering. The weights are calculated as the user interacts with the list by reordering at least one item on the list. Processes that the weight inference engine undergoes to calculate these new weights is explained below with reference to FIGS. 13-17.

Figure 10A:
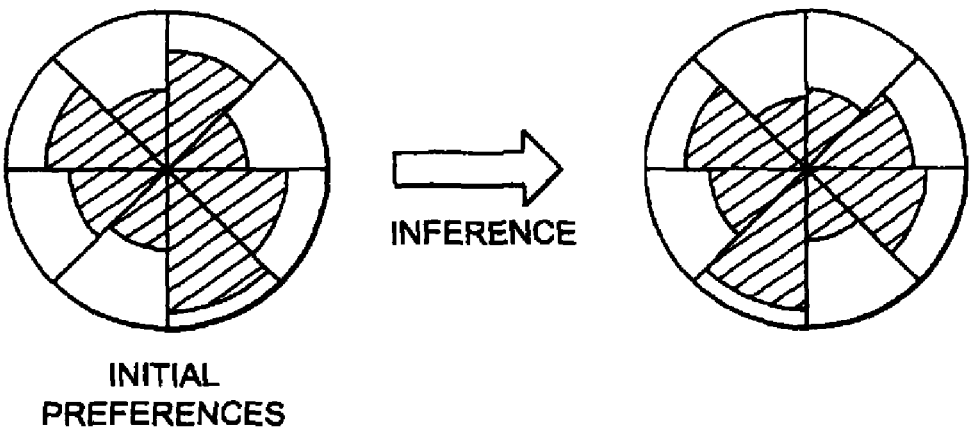
FIGS. 10A through 10C show several exemplary techniques to display the changes in weights as calculated after reordering.
Figure 10B:
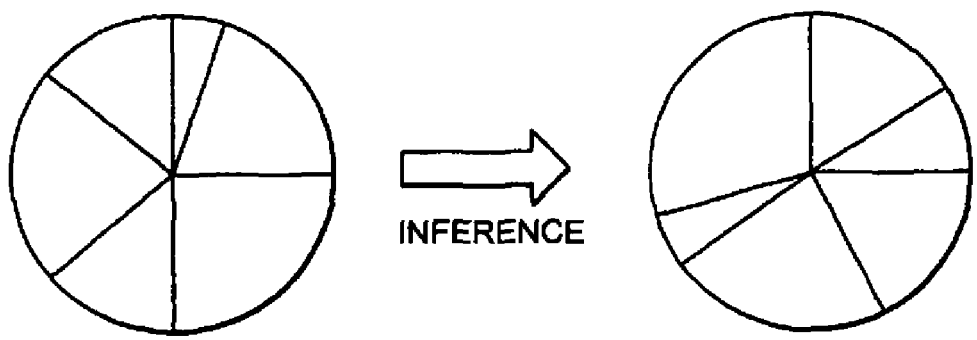
Figure 10C:
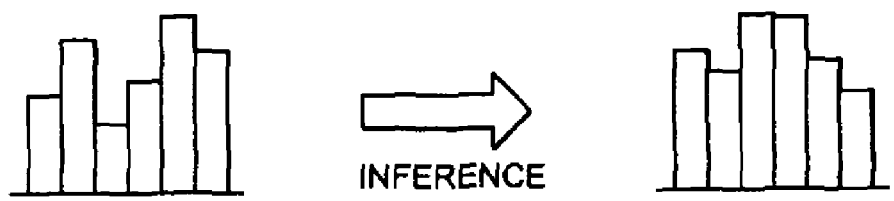

FIGS. 10A, 10B, and 10C illustrate three exemplary ways that the weights of the properties or criteria may be displayed to the user. FIG. 10A shows a pie chart wherein each of six criteria has an equal share of a circle. The user inputted weights are displayed by shading in portions of each "piece of pie." After the user reorders the list new weights are calculated and displayed in the same manner. Therefore the amount of shading in each section is an indication to the user of the weight given to the criteria.

FIG. 10B is similar to FIG. 10A wherein each criteria is represented by a portion of a circle. In this example however the weight of each criteria is shown by the size of the portion of the circle (it is reflected by the width of the angle of the quadrant representing the criterion).

FIG. 10C is another example of illustrating weights. In this case the initial weights input by the user are shown as bar graphs. A low weight is demonstrated by a low bar, and a heavily weighted criteria is shown by a high bar. Once the user re ranks an item on the list weights are calculated and the appropriate sizes of the bars are shown to reflect this new order.

FIG. 11 is a screen shot of a user provided list of alternatives and their desirabilities (in this case, the list is limited to a single entry out of three possible ones). With additional reference to FIG. 2, this is another way for the user to interact with the weight inference engine 43. Not only is the engine 34 capable of adjusting weights based on initially input weights, but also weights may be generated from user-provided list 47. Exemplary processes for calculating weights from a user input list 47 are described below with reference to FIGS. 18-23.

FIG. 12 is a screen shot of the weight inference engine results displayed to the user given the list as shown in FIG. 11. The inference engine uses the desirability of the items on the list to infer or generate the preferences of the user. For example, if the user ranks as his top three car choices 1) Ferrari 2) Mustang 3) Porsche, the engine may return weights showing that the user heavily favors performance and is not concerned with price. On a scale of zero to one, price weights would be close to zero while performance weights would be close to one. In this case, the application is limiting itself to a database of Ford models, thereby displaying the Ford models that best fit the BMW 325i model for which the user has stated a high level of desirability: this embodiment of the invention can, therefore, search for "like" models across manufacturer product lines.

Figure 13:
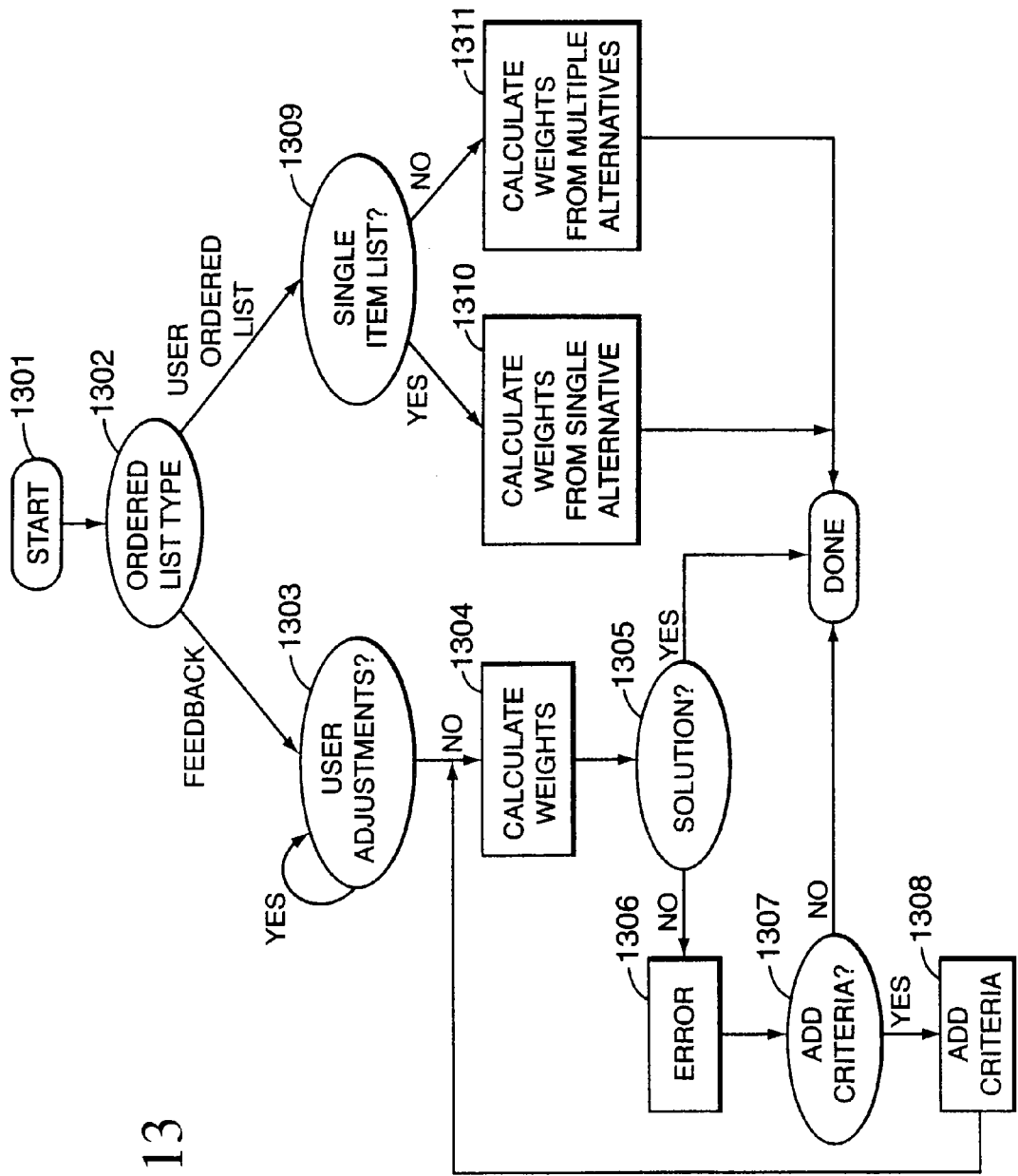
FIG. 13 is a flow-diagram of a process implemented by the weighted inference engine of FIG. 2.

FIG. 13 is a flow diagram of a process that may be implemented by the weight inference generator 43 (see FIG. 2). After the process is started in an operation ("act") 1301, an ordered list is provided in an operation 1302. If the user wishes to provide feedback, an operation 1303 is invoked to allow user adjustment. An example of user feedback is a reordering of alternatives on the list as shown in FIGS. 7-9. New weights are now calculated in an operation 1304 based on this new reordering. The specifics of the algorithm for weight calculation in operation 1304 will be detailed in FIGS. 14-20. In an operation 1305 it is determined if there is a solution to the weighting necessary to satisfy the reordered list. If there is a proper solution the process is finished. If there is no solution based on the reordered list, an error message is generated in an operation 1306. This message alerts the operator that the new reordering can not be justified with new weights. The user is then prompted in an operation 1307 to add a new criteria that may be used in the weighting process. Not entering a new criteria results in a finished erroneous process. In an operation 1308 the user adds some new criteria and the process loops back to operation 1304 to try to calculate the weights. Therefore, the process of weight calculation allows the user to add criteria indefinitely until a valid weight solution can be obtained.

The process described thus far with respect to FIG. 13 uses a ranked list provided by an initial inputting of weights by the user, i.e. "feedback." Alternatively, a user ordered list can be provided. More particularly, an operation 1309 begins with an ordered list directly input by the user. It is first determined in this operation whether the list is a single item or multiple ranked items. A single item list proceeds to an operation 1310 where weights are calculated based on this one item. A multiple item list proceeds to an operation 1311 where weights are calculated. Once the weights are calculated they are displayed to the user to provide insight as to what preferences drive the user's decision making process. The specific algorithms used in operations 1310 and 1311 are detailed hereinafter.

Figure 14:
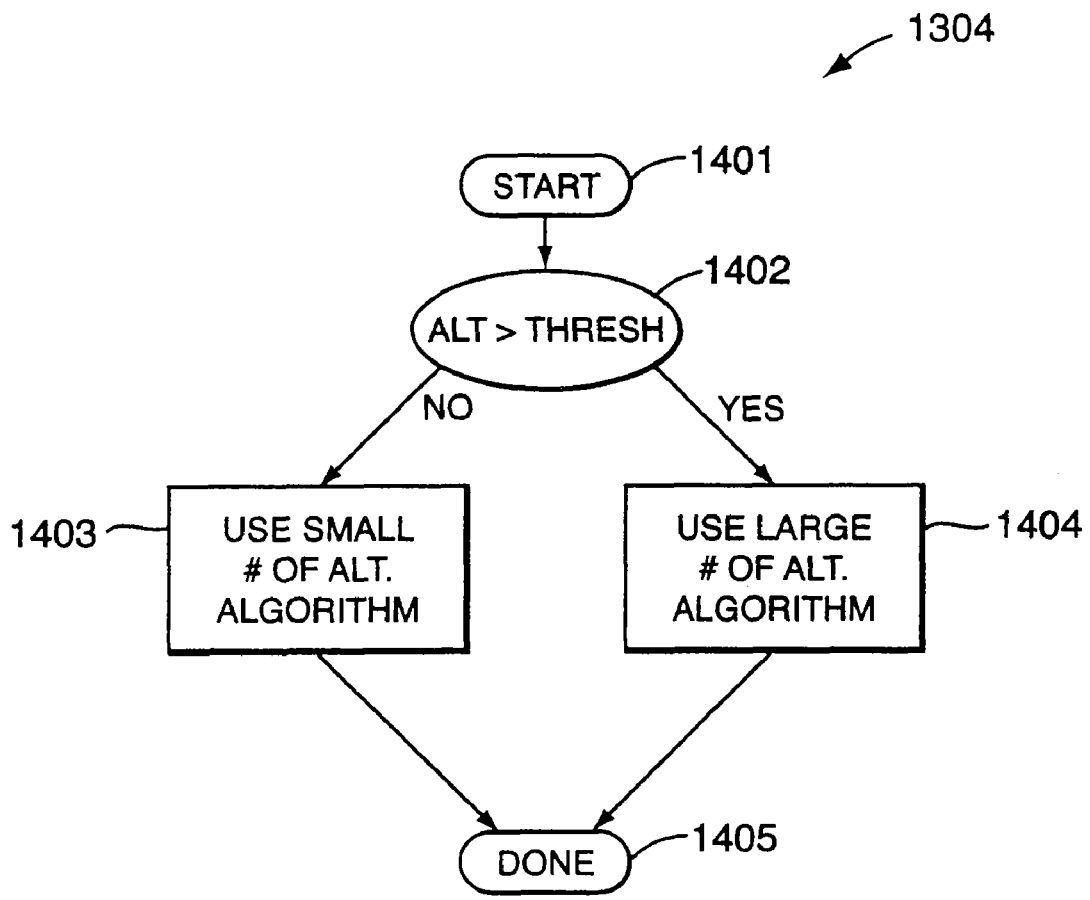
FIG. 14 is a flow diagram of the "Calculated Weights" operation of FIG. 13.

FIG. 14 is a flow diagram illustrating the weight calculation operation 1304 of FIG. 13 in greater detail. For example, after the process begins in operation 1401, it is determined in operation 1402 if the number of items on the ranked list (alternatives or "alt") is greater than some threshold ("thresh") in order to choose a proper methodology. If a small number of items are on the list (i.e. alt <=thresh), then an operation 1403 will use a "small number of alternatives" of algorithm to calculate the weights. This algorithm is illustrated in greater detail in FIGS. 15-17. If a large number of alternatives are ranked in the list (i.e. alt>thresh), an operation 1404 uses a different algorithm to calculate the weights. Operation 1404 is illustrated in more detail in FIGS. 18-20.

It should be noted, as appreciated by those skilled in the art, that the appropriate algorithm can be selected based on any number of heuristics of which the simple determination of the number of alternatives on the list is just one example. The illustrative processes 1403 and 1404 solve the same problem, which is to determine new weights by adjusting initially input weights based on the users reordering of the ranked results list, but by different methodologies. The process is completed at 1405.

Figure 15:
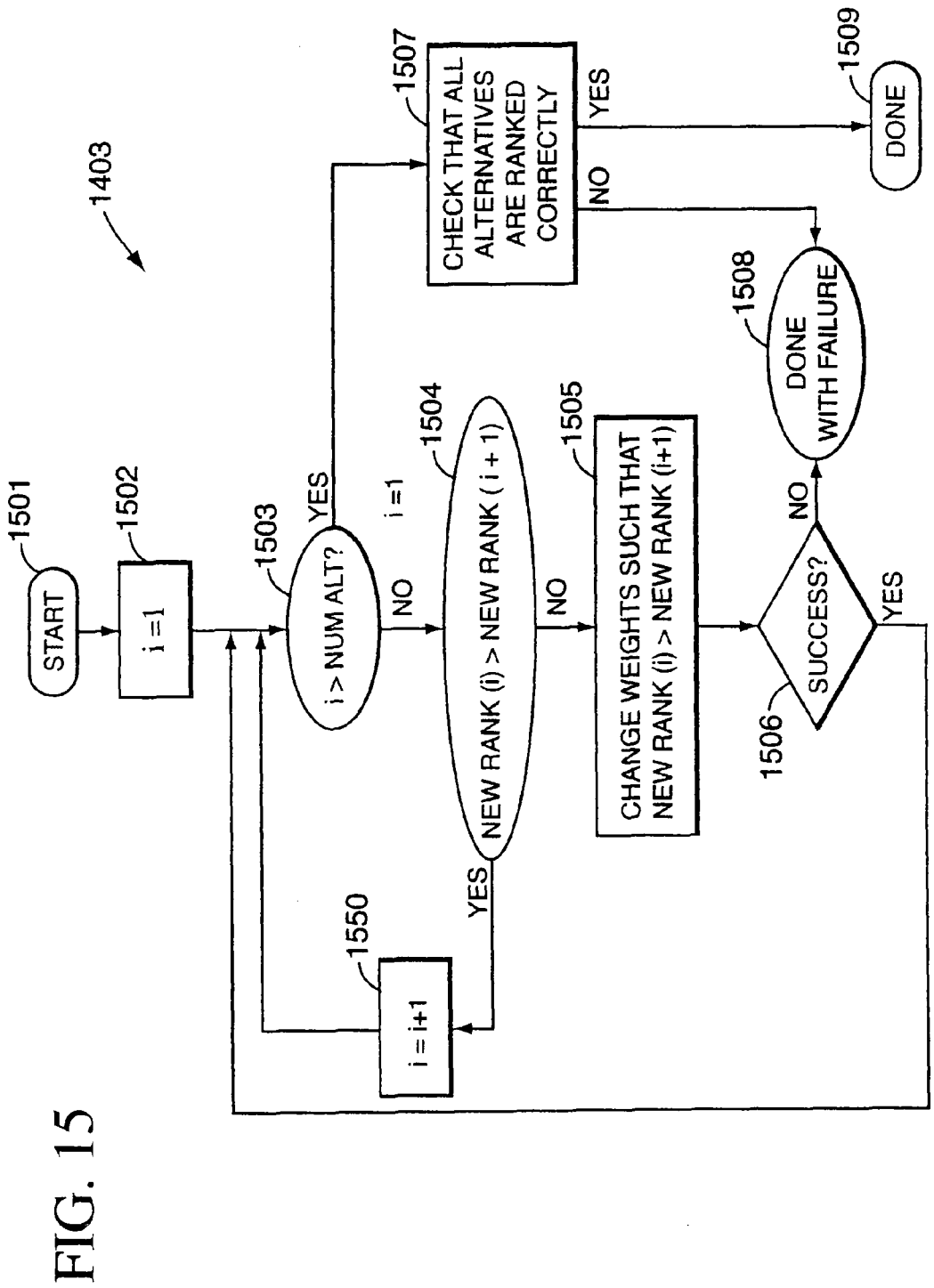
FIG. 15 is a flow diagram illustrating a "Use Small #" 1403 process of FIG. 14.

FIG. 15 is a flow diagram illustrating an exemplary process of operation 1403 in greater detail. Starting at 1501, a counter "i" is initialized to equal 1 (i=1), in an operation 1502. A decision operation 1503 determines if all alternatives have been ordered; if so, the process continues with an operation 1507. If not, an operation 1504 compares array element NewRank(i) to array element NewRank(i+1). If NewRank(i) is greater than NewRank(i+1), i is incremented by one, (i=i+1), in an operation 1550. If NewRank(i) is less than NewRank (i+1), the weights are changed in operation 1505 such that NewRank(i) is greater than NewRank(i+1). If it is not possible to modify the weights such that NewRank(i) is greater than NewRank (i+1) as determined by operation 1506, then the process indicates a failure at operation 1508. Otherwise, i is incremented by 1, and operation 1503 is repeated. In other words, the process described with reference to FIG. 15 constantly changes the weights of the search criteria and compares the rankings of all the alternatives on the list until the weights give the proper ranking.

Figure 16:
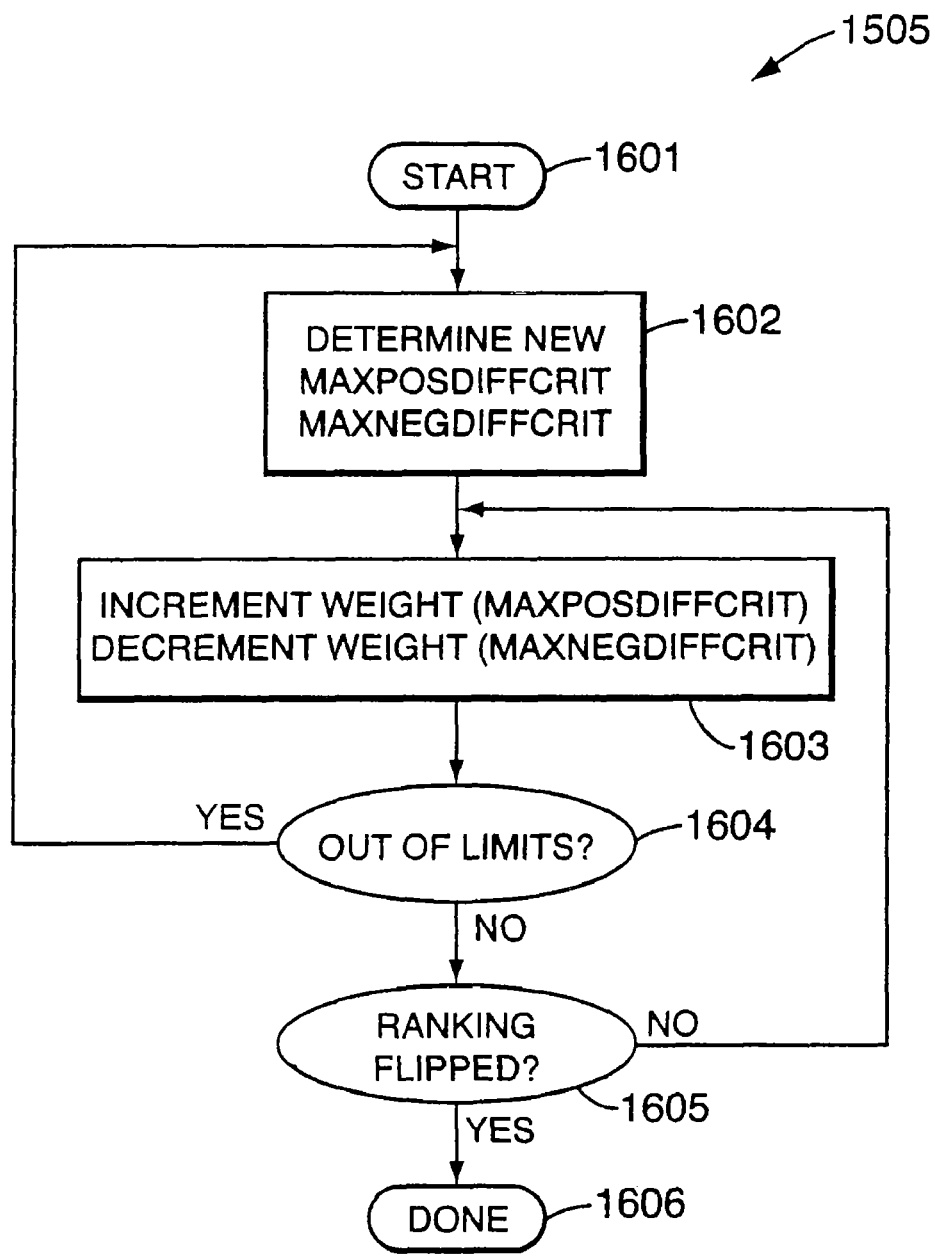
FIG. 16 is a flow diagram illustrating the "Change Weights" process of FIG. 15 in greater detail.

FIG. 16 is a flow diagram further illustrating operation 1505 in FIG. 15. It is noted that the process of changing weights in this exemplary embodiment is accomplished by comparing two items on the list at a time. After starting at 1601, the maximum positive and negative differences between criteria of two ranked items in the ordered list is determined in an operation 1602. For example, the difference in price between a Yugo and a Ferrari would be the maximum positive difference in criteria. In an operation 1603, the weight corresponding to the maximum positive difference is incremented while the weight corresponding to the maximum negative difference is decremented. The increment and decrement are done with the same absolute value, to preserve the net sum of the weights to be equal to 1.0.

In this example a maximum negative difference would be in performance. An operation 1604 determines if these newly changed weights are within limits, i.e. greater than zero and less than one. If the new weights are out of limits the process returns to operation 1602 for a new determination of positive and negative differences. In operation 1605 it is determined if the rankings of the two items in the list have been flipped. If the rankings are not flipped, the process returns to operation 1603. If the rankings of the two items in the list are flipped as determined by operation 1605, the process is successful and finished at 1606.

The pair-wise reordering described above attempts to keep the new weights close to the initially input weight values. The weights of the maximum positive and maximum negative criteria may be changed by a small increment until the newly determined weights have flipped the rankings as desired. Once the rankings have been flipped all other items on the list are checked to ensure that their ordering is proper, since the new weights may have modified the rankings in the list.

FIG. 17 is a table which provides an example of how the weights are adjusted in order to "flip" the ordering of two items on the ranked list. In this example three cars are considered as making up the ranked list, Yugo, Mustang and Ferrari. The criteria considered for each car is price, performance and comfort. The numbers under each criteria column indicate on a scale of zero to one, how that specific car ranks in that specific criteria category. With a "1" being the best ranking, a Ferrari's performance rates as 0.9 while the price of a Yugo is rated at 0.9. Low marks are shown for the price of a Ferrari and the performance and comfort of a Yugo.

In this example the initially input weights resulted in a ranked list of 1) Ferrari 2) Mustang 3) Yugo. Using the drop down menu as shown in FIG. 8, the user desires to rank the Mustang in the number 1 position, with the Ferrari being second and the Yugo being third. The process of FIG. 16 then occurs. Using the values of the criteria for Ferrari and Mustang it is first determined which criteria have the maximum positive and negative differences. In this example price has the maximum negative difference of −0.3 while performance has the maximum positive difference of 0.2. The initial weights input by the user were Price . . . 0.5, Performance . . . 0.3, and Comfort . . . 0.1. The algorithm then proceeds to increment and decrement the initially input weights by a small amount such as 0.05 in the criteria corresponding to the maximum positive and maximum negative criteria. If this "flips" the ranking the algorithm is done. If the ranking is not flipped, i.e. the total score of Ferrari is still greater than the total score of Mustang, the weights are incremented and decremented again.

As a result, in this example the newly determined weight of Price is 0.75, and the newly determined weight of Performance is 0.05. The total score for each car is the sum of each criteria's value multiplied by the weight for that criteria. With these new weights, the total score for each car results in ordering of the ranked list as 1) Mustang 2) Ferrari 3) Yugo. This is the desired order (as re-ranked by the user) so the weights as newly determined are justified. These new weights may then be displayed to the user in the manner as shown in FIGS. 10A-10C or as in FIG. 9.

Figure 18:
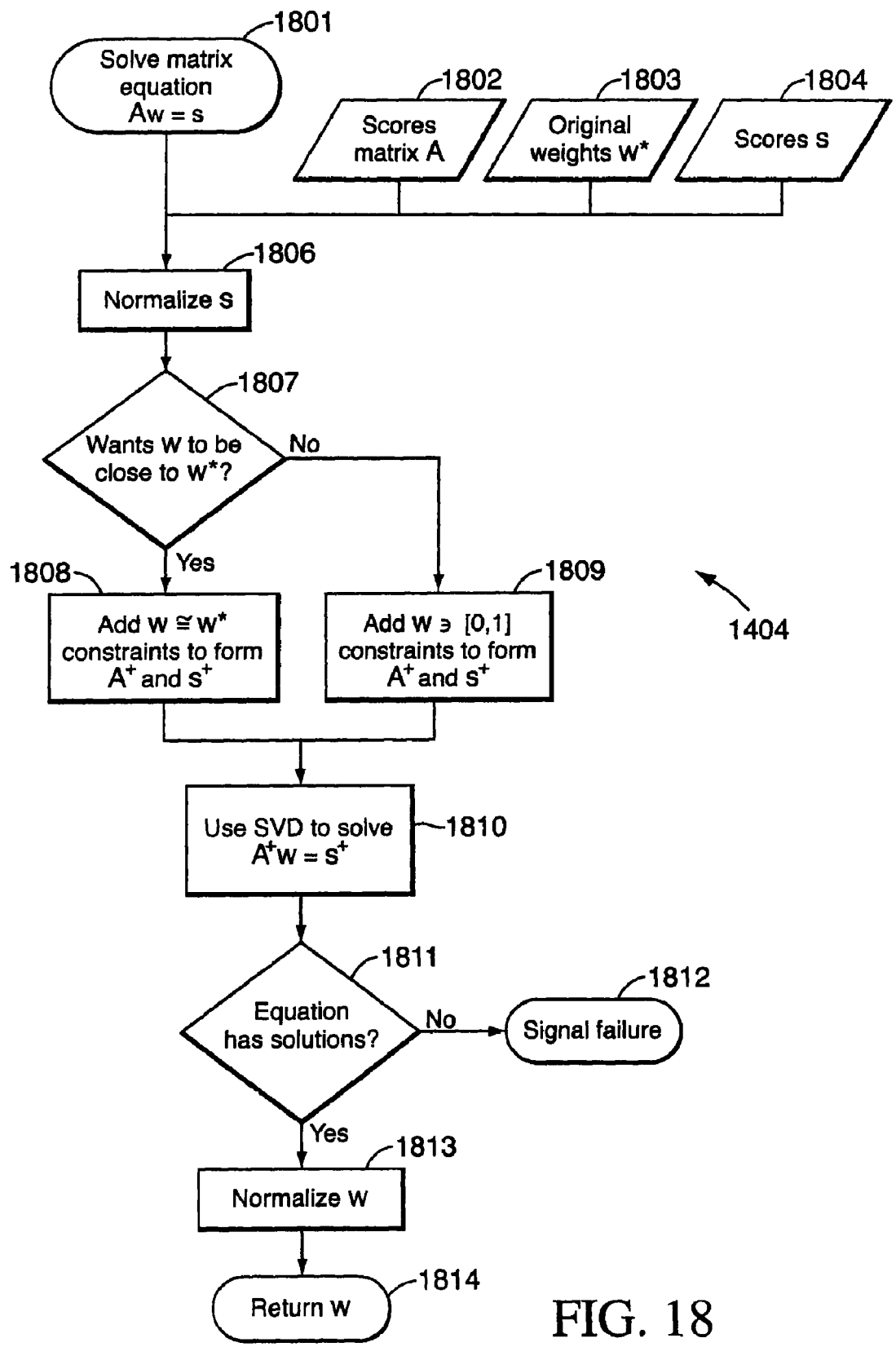
FIG. 18 is a flow diagram illustrating a "Use Large #" 1404 process of FIG. 14.

FIG. 18 contains a more detailed description of operation 1404 from FIG. 14. In this case, the inference engine sets up a system of linear equations, which it solves to obtain the new weight, as described below.

The ranking process can be cast as a matrix equation Aw=s, where A is a matrix of individual criterion scores, w is the vector of weights, and s is the vector of final scores. The vector w contains N elements (the number of weights), and the vector s contains X elements (the number of alternatives). The matrix A contains the individual scores for each criterion in each alternative; it has X rows (the number of alternatives) and N columns (the number of criteria or weights). The individual scores are calculated as follows.

The criteria scores can be collected into matrices analogously to what is done with value matrices; these score matrices are collectively called A in this document.

$$A = \begin{pmatrix} a_{11} & a_{12} & \cdots & a_{1a} \\ a_{21} & a_{22} & \cdots & a_{2a} \\ \vdots & \vdots & \ddots & \vdots \\ a_{x1} & a_{x2} & \cdots & a_{xn} \end{pmatrix}$$

$$a_{ji} = 1.0 - \frac{|v_{ij} - v_j^*|}{|\max(v_j^*) - \min(v_j^*)|}$$

Here, $a_{ij}$ is the criterion score for criterion j in alternative i.

$v_{ij}$ is the value for criterion j in alternative i.

$v^*_j$ is the ideal value for criterion j.

max(v*$_j$) and min(v*$_i$) are the maximum and minimum allowed values for the ideal, respectively.

In the case of the ranking process, A and w are known, and s is desired. In the case of the process described in FIG. 18, A and s are known, and w is desired; therefore, the process attempts to solve the matrix equation by calculating w=A$^{-1}$s, as will be apparent to those skilled in the art.

As noted previously, FIG. 18 illustrates operation 1404 of FIG. 14 in greater detail. This is another example of an algorithm used to calculate new weights from initial weights after a reordering of the results list. After starting at operation 1801, the process sets forth to solve the matrix equation Aw=s, in an operation 1802. This involves beginning with a scores matrix A of alternatives in 1802, using the original weights w at 1803, and the scores vector s at 1805. After normalizing the score vector s in an operation 1806, it is determined if the new weights are desired to be close to the original weights in an operation 1807. If the new weights are desired to be close to the original weights, this constraint is accomplished by augmenting the A matrix with an N by N (N×N) identity matrix in operation 1808, and the s vector with the original weights, as seen in FIG. 19. If it is not necessary that the new weights be close to the original ones, operation 1809 adds a constraint to ensure that the new weights are positive. It does so by augmenting the A matrix with a 2N by N (2N×N) band-diagonal matrix, and the s vector with N identical pairs of values. The values in the pair have been chosen so that the final weights will be positive, as illustrated in FIG. 20. In an operation 1810, a vector w of weights is calculated using the well-known mathematical technique of single value decomposition or SVD. In an operation 1811 it is determined if the matrix equation has a valid solution, if not the operator is notified of this in an operation 1812, if so the weights vector is normalized in operation 1813 and returned to the user in operation 1814. Again, the newly calculated weights may be displayed a variety of manners, including one or more of those described above. It should be noted that operation 1809 may need to be repeated a number of times, with different values in the constraint pair, until a solution with positive weights is found.

Figure 21:
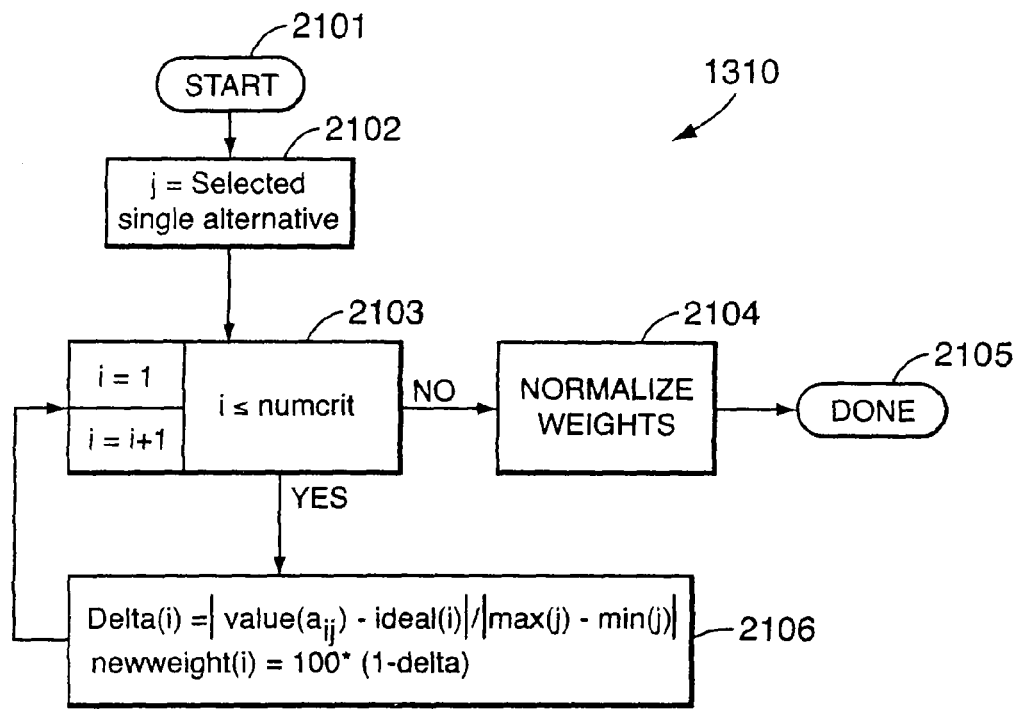
FIG. 21 is a flow diagram illustrating the "Calculate Weights" process 1310 of FIG. 13 in greater detail.

FIG. 21 illustrates operation 1310 in FIG. 13 in greater detail. This method or process 1310 is an example of an alternative process that can be implemented by the weight inference engine 43 (see FIG. 2). This second process or "algorithm" is used to infer and display weights when the user inputs a single item on the ranked list as his top choice.

With only one item in the list, for each search criterion, a normalized delta or "distance" between the actual value of the criterion and the ideal value is calculated. The process 1310 beings at 2101, and in a step 2102 a user selects a single alternative "j." An iterative loop 2103 initializes a variable "i" to 1, and then increments i by one until it is greater than the number of criteria "numcrit." For each iteration, a proportional weight is assigned to each criterion in an operation 2106. That is, the smallest delta (e.g. the criterion value closest to the ideal) gets the largest weight; the next largest delta gets the next smallest weight and so on. Specifically, weight=100*(1−delta). Weight is always a value between 0 and 100 in this example. The weights are then normalized and returned and displayed to the use in an operation 2104 after the iterative loop 2103 is exited.

For example, if the user inputs Yugo as his top choice, the Yugo has stored an actual value for each search criteria. For further example, price for the Yugo may be 0.95, where 1 is the highest value. The process of FIG. 21 determines that giving price a high weight would result in (or justify) the Yugo being the top choice. The algorithm would also determine that performance is not given much weight as the Yugo's performance value may be 0.1.

Figure 22:
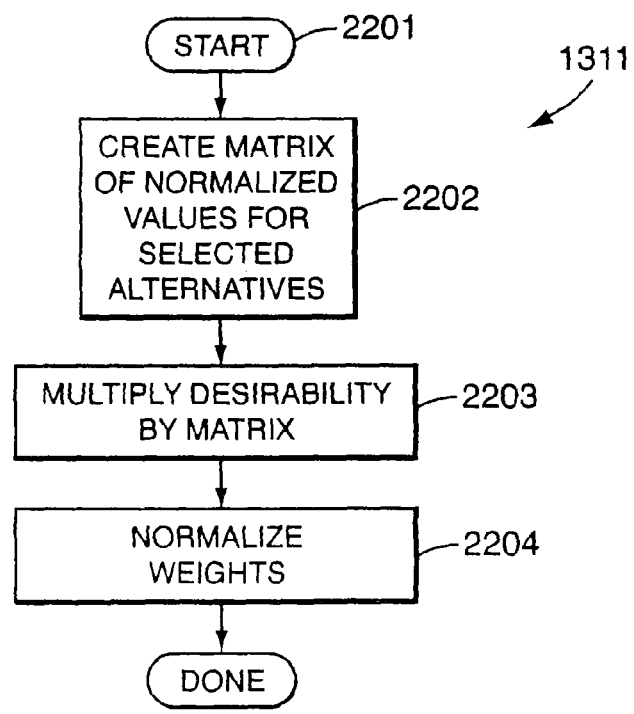
FIG. 22 is a flow diagram illustrating the "Calculate Weights" process 1311 of FIG. 13 in greater detail.

FIG. 22 illustrates operation 1311 of FIG. 13 in greater detail. This process is used when the user ranks a number of alternatives in order of desirability, and then asks to calculate the weights so that a run of the ranking engine with the new weights orders them as specified by the user. The desirability is expressed as a number, typically on a scale of 0 to 100, which describes how much the user likes the alternative. For example, the user may select three car models as follows: Mustang, 95; Porsche, 85; Yugo, 40. This indicates that Mustang and Porsche are well-liked cars, with Mustang a bit more than Porsche, whereas Yugo is not a favorite.

The weights are obtained via a weighted average of the individual criterion scores, as follows. For each criterion i, sum over all ranked alternatives the product of the alternative's desirability by the criterion score for the alternative:

$$w_i = \sum_{j=1}^{x} p_j a_{ji}$$

where $a_{ij}$ is the criterion score for the i'th criterion and j'th alternative, and $p_j$ the desirability of the j'th alternative. Note that the $a_{ij}$ used here form the matrix A of criterion scores introduced earlier.

The embodiment of FIG. 22 preferably uses matrix multiplications to calculate the weights. The process 1311 begins at 2201 and, in an operation 2202, a matrix A of normalized scores for the selected alternatives is created. In an operation 2203 the desirability vector p is multiplied by the scores matrix A to yield the un-normalized weights. These weights are normalized in operation 2205 and then returned to the user, where they may be input into the ranking engine or displayed.

While this invention has been described with reference to certain preferred embodiments, 25 alternative and/or equivalent embodiments will become apparent to those skilled in the art upon a reading of the detailed description and a study of the drawings. It is therefore intended that the following appended claims encompass all such alternatives and equivalents as fall within the true spirit and scope of the present invention.

What is claimed is:

1. A computer implemented method for reconstructing a first search query corresponding to a user, and inferring user preferences manifested as query parameters, said computer implemented method comprising:

receiving a plurality of search results, said plurality of search results equivalent to a first output derived from executing said first search query;

determining a plurality of query parameters based on said plurality of search results, wherein said plurality of query parameters corresponds to user preferences, said plurality of search results includes an ordered results list, items from said ordered results list each have values for one or more specific criteria, and said values are associated with said items of said ordered results list;

generating, based on said ordered search results list, specific parameter values for said plurality of query parameters;

constructing a second search query based on said plurality of search results, said plurality of query parameters, and said specific parameter values;

wherein said second search query is equivalent to and a reconstruction of said first search query in that a second output derived from executing said second search query results in said plurality of search results, whereby said first search query is reconstructed and said user preferences are inferred via said plurality of search results without further knowledge of said first search query.

2. The computer implemented method for reconstructing a first search query as recited in claim 1, wherein said ordered results list is obtained from a first database.

3. The computer implemented method for reconstructing a first search query as recited in claim 1, wherein said ordered results list is obtained from said user.

4. The computer implemented method for reconstructing a first search query as recited in claim 3, wherein said ordered results list obtained from said user is a list of items ranked in an order of desirability by said user.

5. The computer implemented method for reconstructing a first search query as recited in claim 4, wherein items in said list of items are automobiles.

6. The computer implemented method for reconstructing a first search query as recited in claim 1, further comprising selecting an algorithm for generating said specific parameter values based on a number of items in said ordered results list.

7. The computer implemented method for reconstructing a first search query as recited in claim 1, further comprising allowing said user to adjust said user preferences and generating a third search query in response to said user adjusting said user preferences.

8. The computer implemented method for reconstructing a first search query as recited in claim 1, further comprising displaying said inferred user preference to said user in a graphical format; allowing said user to adjust said inferred user preferences through a graphical user interface; and generating a third search query in response to said user adjusting said inferred user preferences.

9. A computer implemented method for constructing a search query based on inferred user preferences for a specific user, said search query including a plurality of query parameters having specific values indicative of user preferences, said computer implemented method comprising:

receiving an ordered list of items selected from a first database and ordered by said specific user, each of said items having item specific values for a plurality of criteria, said item specific values defined by said items without reference to user preferences, said ordered list of items each having values for one or more specific criteria, and said values are associated with said items of said ordered list of items; and constructing said search query using said ordered list and said item specific values for said plurality of criteria, said constructing including:

capturing said ordered result list;

capturing said plurality of query parameters;

measuring values of said criteria for each item;

deriving said query parameters including importance weighting for each of the criteria that generates said ordered result list; and wherein executing said constructed search query on said first database results in said ordered list of items.

10. A computer system for constructing a search query based on inferred user preferences for a specific user, said search query including a plurality of query parameters having specific values indicative of user preferences, said computer system comprising:

a receiver unit receiving an ordered list of items selected from a first database and ordered by said specific user, each of said items having item specific values for a plurality of criteria, said item specific values defined by said items without reference to user preferences, said ordered list of items each having values for one or more specific criteria, and said values are associated with said items of said ordered list of items; and a search construction engine for constructing said search query using said ordered list and said item specific values for said plurality of criteria, said search construction engine further including:

a first engine that captures said ordered result list, said ordered result list of items having values for one or more said associated criteria values, and said values are associated with said items of said ordered result list of items;

a second engine that captures a plurality of query parameters;

a third engine that measures values of every criteria for each result item; and a fourth engine that derives said query parameters including importance weighting for each of the criteria that generate said ordered result list.

11. A computer system for reconstructing a first search query corresponding to a user, and inferring user preferences manifested as query parameters, said computer implemented method comprising:

means for receiving a plurality of search results, said plurality of search results equivalent to a first output derived from executing said first search query;

means for determining a plurality of query parameters based on said plurality of search results, wherein said plurality of query parameters corresponds to user preferences, said plurality of search results includes an ordered results list, items from said ordered results list each have values for one or more specific criteria, and said inherent values are associated with said items of said ordered results list;

means for generating, based on said ordered search results list, specific parameter values for said plurality of query parameters;

means for constructing a second search query based on said plurality of search results, said plurality of query parameters, and said specific parameter values;

wherein said second search query is equivalent to and a reconstruction of said first search query in that a second output derived from executing said second search query results in said plurality of search results, whereby said first search query is reconstructed and said user preferences are inferred via said plurality of search results without further knowledge of said first search query.

12. A method comprising:

receiving a first plurality of search items, wherein each item of the first plurality of search items has a corresponding plurality of criterion, and wherein each criterion of the plurality of criterion has a corresponding criterion value; and computing a plurality of weighted parameters, wherein each weighted parameter of the plurality of weighted parameters corresponds to a respective criterion of the plurality of criterion and is weighted to indicate a preference for the respective criterion, and wherein a plurality of scores, each of the plurality of scores corresponding to respective items of the first plurality of items, calculated by applying some function to the weighted parameter and the respective criterion value of the corresponding criterion, results in items of the first plurality of items having the highest score;

wherein computing a plurality of weighted parameters comprises:

(i) creating a desirability vector p, wherein each element $p_j$ of the desirability vector p indicates the desirability of a corresponding item relative to the other items of the first plurality of items;

(ii) calculating a plurality of criterion scores $a_{ji}$, wherein each criterion score of the plurality of criterion scores corresponds to the respective criterion, and wherein each criterion score of the plurality of criterion scores corresponds to a different item;

(iii) creating a scores matrix A from the plurality of criterion scores; and (iv) multiplying the desirability vector p by the scores matrix A to yield a plurality of weighted parameters; and wherein computing a weighted parameter $w_i$ of the plurality of weighted parameters corresponding to the respective criterion comprises:

(v) creating a desirability vector p, wherein each element $p_j$ of the desirability vector p indicates the desirability of a corresponding item relative to the other items of the first plurality of items;

(vi) calculating a plurality of criterion scores $a_{ji}$, wherein each criterion score of the plurality of criterion scores corresponds to the respective criterion and wherein each criterion score of the plurality of criterion scores corresponds to a different item; and (vii) calculating a weighted parameter corresponding to the respective criterion by applying a scoring function $f(w, a_{ji})$ so that for every $p_j$, $p_j=f(w, a_{ji})$.

13. The method of claim 12 further comprising:

receiving user feedback as a second plurality of search items, wherein the second plurality of search items include the same items as the first plurality of items but can be ordered differently than the first plurality of items; and computing a plurality of weighted parameters, wherein each weighted parameter of the plurality of weighted parameters corresponds to a respective criterion of the plurality of criterion and is weighted to indicate a preference for the respective criterion, and wherein a plurality of scores, each of the plurality of scores corresponding to respective items of the first plurality of ranked items, calculated by summing the products of each weighted parameter and the respective criterion value of the corresponding criterion results in the highest ordered item of the second plurality of items having the highest score.

* * * * *